(12) United States Patent
Prakasam

(10) Patent No.: US 8,172,069 B2
(45) Date of Patent: May 8, 2012

(54) DIVERTER BALL CONVEYOR

(75) Inventor: Ramaswamy Prakasam, Coimbatore (IN)

(73) Assignee: Habasit AG, Reinach (CH)

( * ) Notice: Subject to any disclaimer, the term of this patent is extended or adjusted under 35 U.S.C. 154(b) by 351 days.

(21) Appl. No.: 12/383,606

(22) Filed: Mar. 26, 2009

(65) Prior Publication Data

US 2010/0243411 A1 Sep. 30, 2010

(51) Int. Cl.
*B65G 47/10* (2006.01)
(52) U.S. Cl. .................... 198/370.09; 198/779
(58) Field of Classification Search .............. 198/779, 198/370.09
See application file for complete search history.

(56) References Cited

U.S. PATENT DOCUMENTS

| | | | |
|---|---|---|---|
| 4,572,358 A * | 2/1986 | Swain | 198/781.04 |
| 5,238,099 A * | 8/1993 | Schroeder et al. | 198/456 |
| 5,240,102 A * | 8/1993 | Lucas | 198/456 |
| 6,758,323 B2 | 7/2004 | Costanzo | |
| 6,968,941 B2 * | 11/2005 | Fourney | 198/779 |
| 6,997,306 B2 * | 2/2006 | Sofranec et al. | 198/779 |
| 7,191,894 B2 | 3/2007 | Costanzo et al. | |
| 7,216,759 B2 * | 5/2007 | Rau et al. | 198/853 |
| 7,237,670 B1 * | 7/2007 | Ryan | 198/779 |
| 7,249,669 B2 * | 7/2007 | Fourney | 198/370.09 |
| 7,249,671 B2 | 7/2007 | Riddick et al. | |
| 7,284,653 B2 * | 10/2007 | Fourney et al. | 198/370.03 |
| 7,344,018 B2 * | 3/2008 | Costanzo et al. | 198/779 |
| 7,360,641 B1 * | 4/2008 | Fourney | 198/779 |
| 7,537,106 B2 * | 5/2009 | Fourney | 198/779 |
| 7,563,188 B2 * | 7/2009 | Ozaki et al. | 474/206 |
| 7,588,137 B2 * | 9/2009 | Fourney | 198/779 |
| 2006/0070856 A1 | 4/2006 | Stebnicki et al. | |
| 2006/0070857 A1 | 4/2006 | Fourney | |
| 2008/0023301 A1 | 1/2008 | Fourney | |
| 2008/0217138 A1 | 9/2008 | Fourney | |

FOREIGN PATENT DOCUMENTS

WO 2007/108852 A2 9/2007

* cited by examiner

*Primary Examiner* — Gene Crawford
*Assistant Examiner* — William R Harp
(74) *Attorney, Agent, or Firm* — Hodgson Russ LLP

(57) ABSTRACT

A diverter conveyor system for a modular belt. The modular belt has at least two belt modules disposed in rows. At least two rows of spheres are disposed in the belt modules and extend through the top and bottom surfaces of the modules. The rows of spheres may be supported by a single cylindrical roller.

17 Claims, 6 Drawing Sheets

DIVERTER BALL CONVEYOR

FIELD OF THE INVENTION

The present invention pertains generally to modular conveying belts and particularly to modular belts with spheres or rollers on the top surface for diverting products on a conveying system.

BACKGROUND OF INVENTION

Roller conveyors using cylindrical rollers or spheres at the top surface of conveying belts are known. The function of the rollers may be accumulation of conveyed products on the moving belt with reduced back pressure, acceleration of the conveyed products, or diversion of conveyed products to either side of the conveyor belt for sorting purposes or for alignment along a guide. For diversion type applications, in most cases, the rollers are driven from underneath the running belt either passively by sliding the belt with the rollers over a support surface, or actively by driving them with another driven belt touching the rollers from the bottom side of the roller belt. Passive drive solutions are shown in the following patents and publications: U.S. Pat. Nos. 6,758,323; 7,191,894; 7,249,671; WO 2007/108852.

In FIG. 6 of WO 2007/108852, parallel longitudinal cylinders are disclosed as an alternative driving support surface. Such cylinders are used in both passive (non-driven) and active driven function in the following patents and publications: U.S. Pat. Nos. 7,237,670; 7,249,669; 7,344,018; and US 2008/0023301. In addition to rollers on the top surface of the belt, balls or spheres can be used for the same purpose as well. As shown in the U.S. Pat. No. 5,238,099; balls may be driven by a conveyor belt disposed in contact with the balls from underneath the belt.

There is a need for a system that reduces the distance between the spheres to improve the support of smaller products during conveying and that reduces the number of cylinders per belt to reduce the cost.

SUMMARY OF INVENTION

The present invention meets the above described need by providing a diverter conveyor system with a modular belt having at least two rows of spheres supported by a cylindrical roller.

BRIEF DESCRIPTION OF THE DRAWING FIGURES

The invention is illustrated in the drawings in which like reference characters designate the same or similar parts throughout the figures of which:

DETAILED DESCRIPTION OF THE INVENTION

Figure 1:
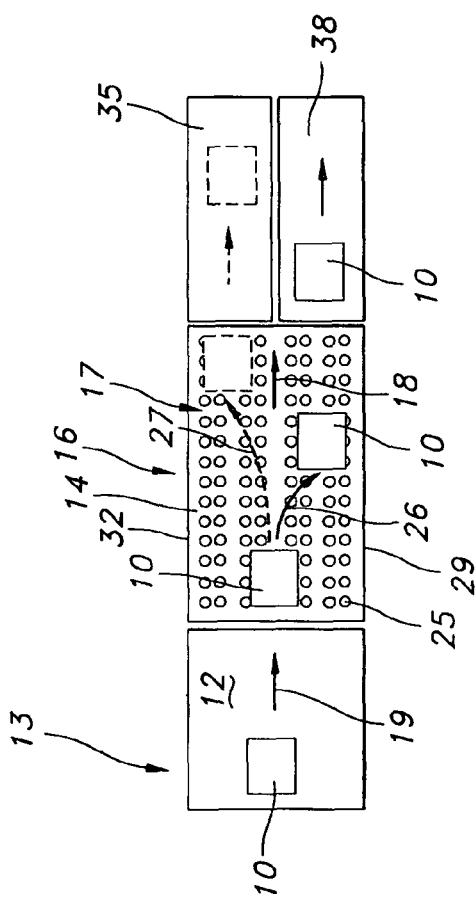
FIG. 1 is a schematic diagram showing a system of the present invention.

In FIG. 1, a plurality of products 10 are shown on a conveyor system. The conveyor system-includes a first belt 13 disposed upstream of the diverter conveyor system 16 of the present invention. The products 10 are conveyed on the upper surface 12 of belt 13 in the direction of arrow 19. Once the products 10 reach the diverter system 16, the products 10 are conveyed on belt 17 from the left to the right hand side with respect to FIG. 1 and are simultaneously conveyed toward one of the sides of the belt 17 by means of spheres 25. Belt 17 travels in the direction of arrow 18. The spheres 25 extend above the top surface 14 of belt 17 and engage with the products 10. Rotation of the spheres 25 can be used to move the products along curved paths indicated by arrows 26, 27. The curved paths provide for conveying between opposite sides 29 and 32 of the belt 17. Downstream of the diverter system 16, a pair of belts 35, 38 move the products 10 along different paths. By rotating the spheres 25 in the downward direction with respect to FIG. 1, the products 10 moves in the direction of arrow 26. Opposite rotation of spheres 25 causes the products 10 to move along the path defined by arrow 27.

Figure 2:
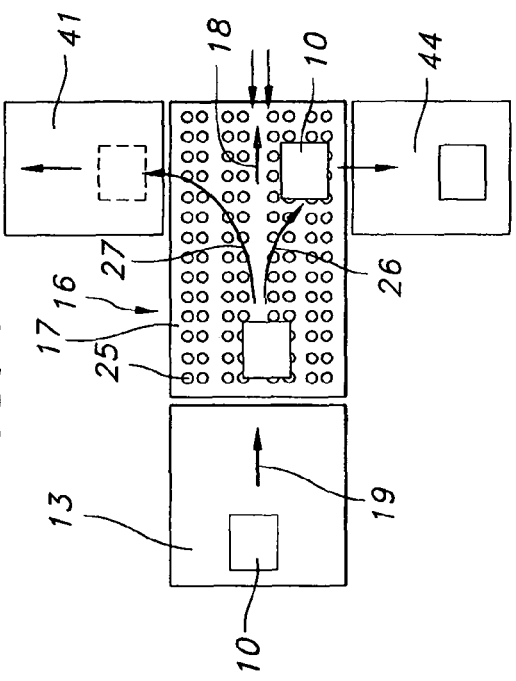
FIG. 2 is a schematic diagram showing the system of the present invention in a different application.

Turning to FIG. 2, another example showing the diverter system 16 of the present invention is shown. The first belt 13 conveys the products 10 to the diverter system 16. A pair of belts 41, 44 extend perpendicular to belt 17. The action of the spheres 25 transfers the products 10 to belts, 41, 44 as will be described in greater detail below.

Figure 3:
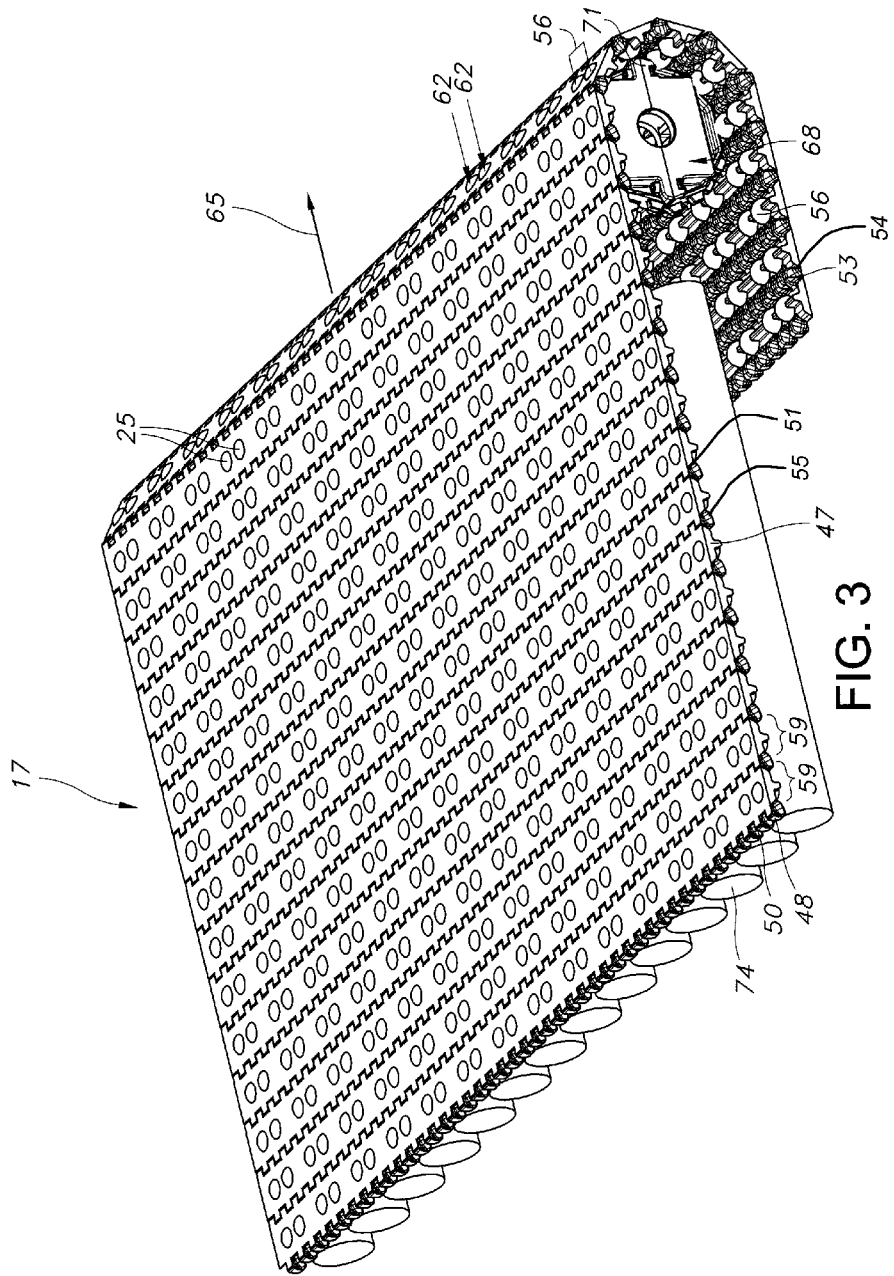
FIG. 3 is a partial perspective view of the system of the present invention with a portion of the belt removed for clarity.

Turning to FIG. 3, a modular belt 17 of the present invention is constructed of modules 47 with intermediate sections 48. A first plurality of link ends 50, having transverse pivot rod openings 51, extend in a first direction from intermediate section 48. A second plurality of link ends 53, having transverse pivot rod openings 54, extend in a second direction opposite the first direction. The first and second link ends 50, 53 are offset from each other such that the first and second link ends 50, 53 on adjacent modules 47 intercalate as will be evident to those of ordinary skill in the art based on this disclosure. The intercalated link ends 50, 53 may be pivotally connected by pivot rods 55. The intercalated link ends 50, 53 may be arranged so that transverse pivot rod openings 51, 54 align to receive one or more pivot rods 55. The spheres 25 are disposed in the intermediate section 48. The spheres 25 may be disposed in pairs with two spheres 25 spaced a short distance apart. The pairs 56 are aligned with pairs 56 on adjacent rows 59 of modules. The aligned pairs 56 form rows 62 extending along the length of the belt in the direction of travel of the belt indicated by arrow 65. The belt 17 may be conveyed by a sprocket 68 having teeth 71 for engaging with belt 17.

Figure 4:
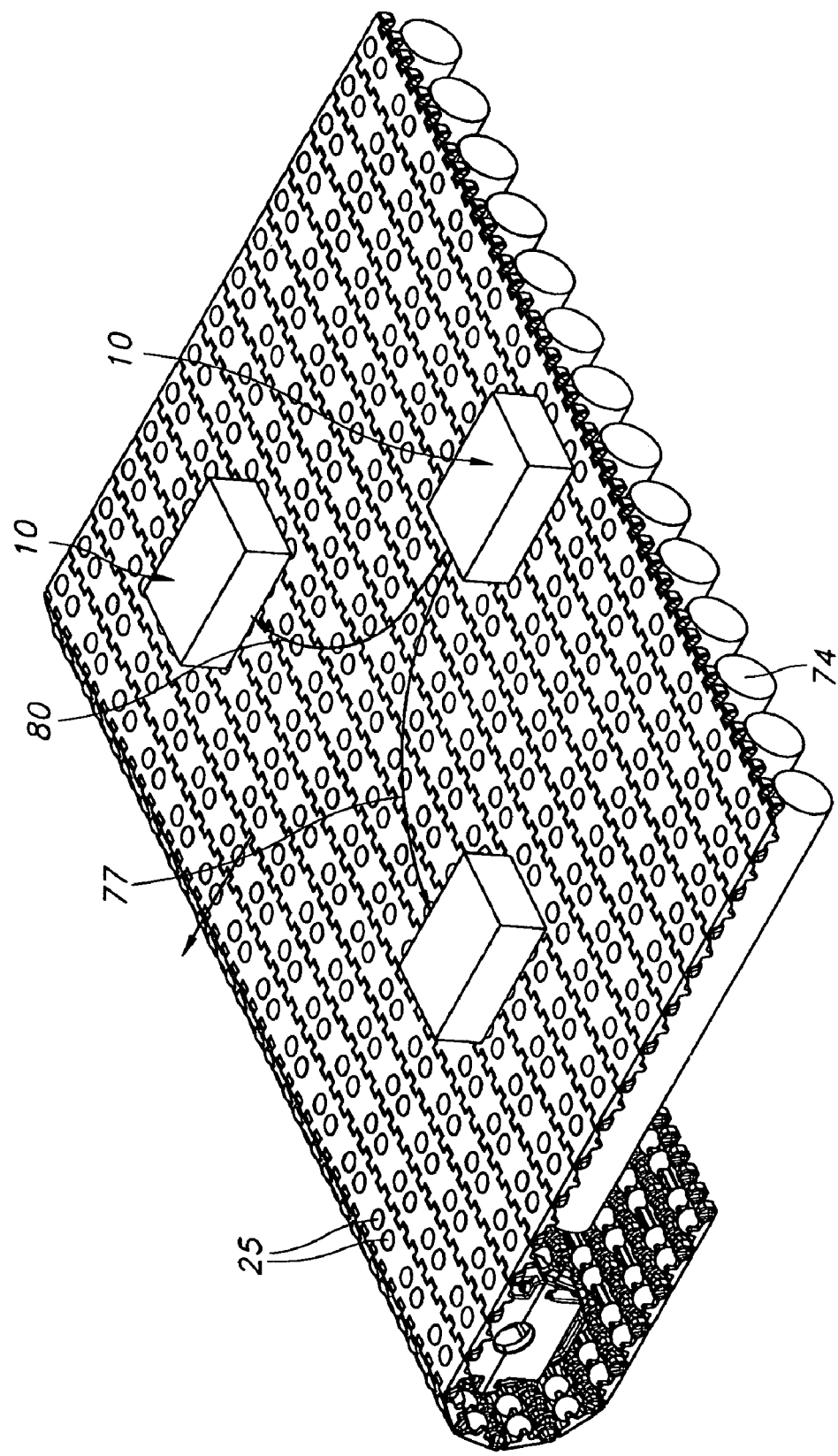
FIG. 4 is a partial perspective view of the system from a different angle.

A plurality of cylindrical rollers 74 are disposed underneath the belt 17. The spheres 25 extend above the top surface of the belt 17 and extend below the bottom surface of the belt such that the cylindrical rollers 74 may be engaged with the spheres 25 in driving relation. The cylindrical rollers 74 may be driven simultaneously and synchronized. Turning to FIG. 4, clockwise rotation of cylinders 74 causes the spheres 25 to rotate counterclockwise and the products 10 to follow the path indicated by arrow 77. Counterclockwise rotation of the cylinders 74 causes the spheres 25 to rotate clockwise and the products 10 to follow the path indicated by arrow 80.

Figure 5:
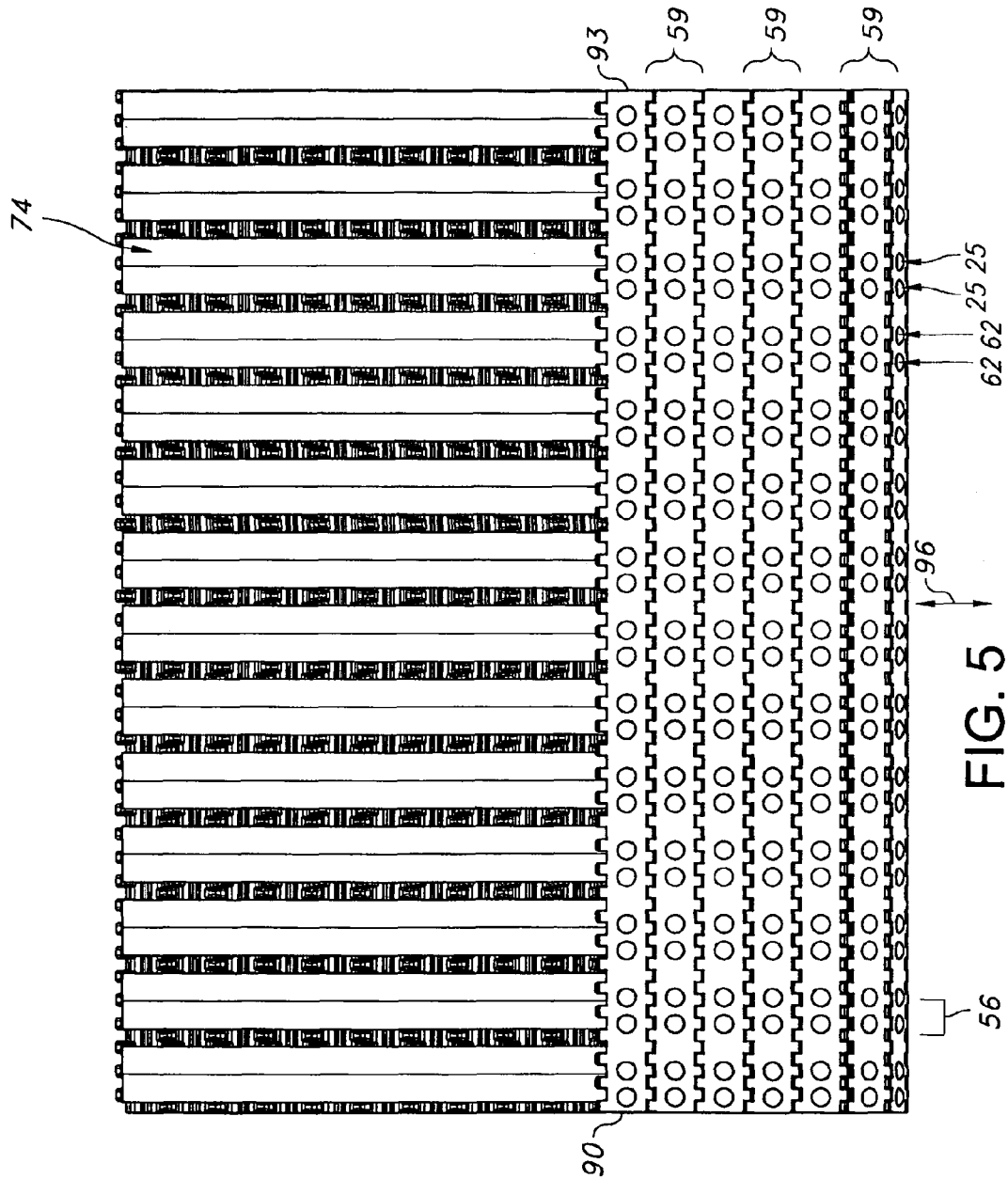
FIG. 5 is a top perspective view of the conveyor of the present invention with a portion of the belt removed for clarity.

In FIG. 5, the arrangement of the belt 17 with respect to the cylindrical rollers 74 is shown. The spheres 25 are disposed in pairs in the modules 47. Each row 59 of modules 47 extends from a first belt edge 90 to a second belt edge 93. The pairs of spheres 25 are aligned in the direction of belt travel indicated by arrow 96. The belt modules 47 may be configured in bricklayed fashion from row-to-row as will be evident to those of ordinary skill in the art based on this disclosure.

Figure 6:
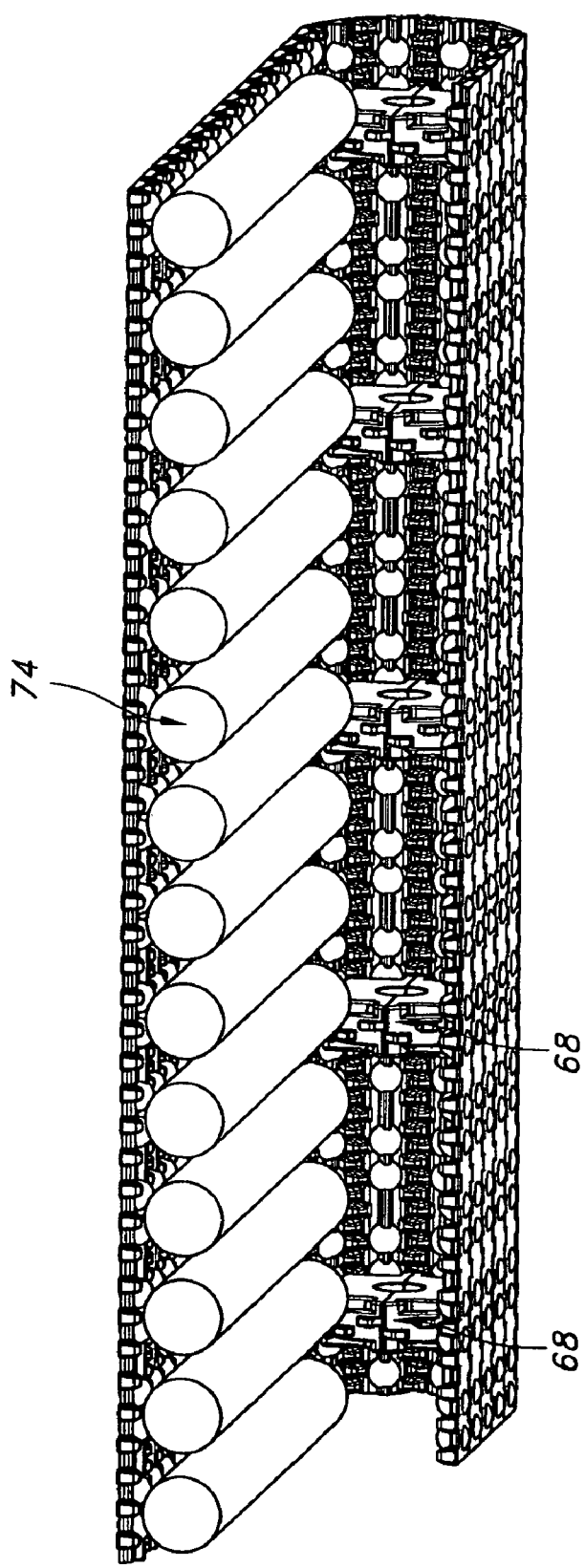
FIG. 6 is a bottom perspective view of the system of the present invention.

As shown in FIG. 6, each cylindrical roller 74 makes contact with two rows of spheres 25. By driving more than one row of spheres 25, the number of cylindrical rollers 74 required for the system, and therefore, the cost is reduced. Also, the closer spacing of the spheres 25 improves the support of smaller products 10.

Figure 7:
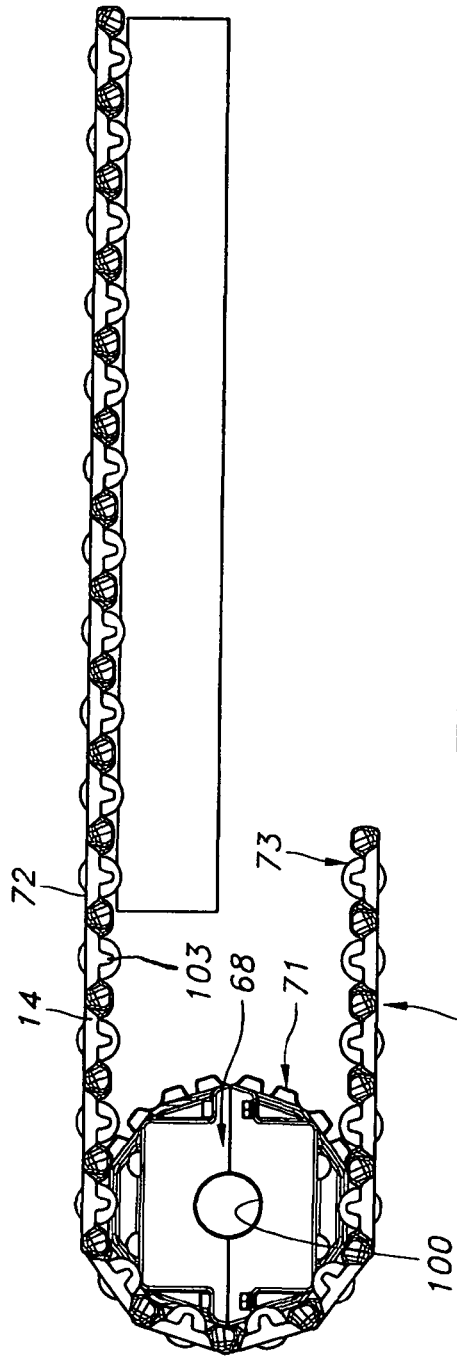
FIG. 7 is a side elevational view of a portion of the system.

In FIG. 7, the belt 17 and sprocket 68 are shown in greater detail. The sprocket 68 has a central opening 100 for receiving a shaft (not shown). The sprocket 68 engages with the belt 17 as it passes over and around. The sprocket 68 has teeth 71 that engage a rib 103 and/or the link ends to drive the belt 17. As shown, the spheres 25 extend above the top surface 72 of belt 17 to contact the products 10 on the belt 17 and extend below the bottom surface 73 of belt 17 to make contact with the cylindrical rollers 74.

Figure 8:
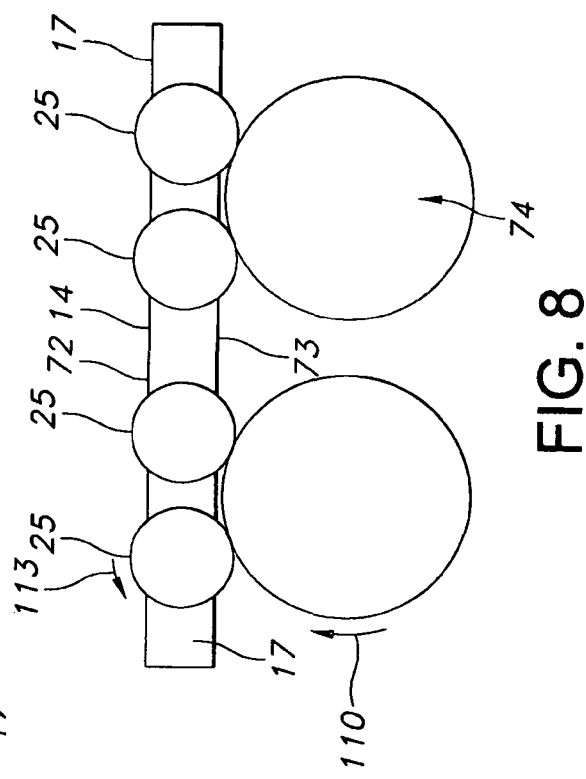
FIG. 8 is a schematic diagram showing the relation between the rollers and the spheres in the belt.

In FIG. 8 a schematic diagram shows the simultaneous engagement of a cylindrical roller 74 with two spheres 25. Rotation of the roller 74 in a first direction indicated by arrow 110 causes each of the spheres 25 to rotate in the opposition direction indicated by arrow 113.

What is claimed is:

1. A diverter conveyor system, comprising:
    a modular belt comprising a plurality of belt modules disposed in rows and a plurality of pivot rods, each pivot rod connecting adjacent modules, the modules having a top surface and a bottom surface, the modules having an intermediate section, a first plurality of link ends extending from the intermediate section, and a second plurality of link ends extending from the intermediate section in a direction opposite to the first plurality of link ends, the first and second link ends having transverse pivot rod openings and being offset such that the first link ends of a first module are capable of intercalating with the second link ends of an adjacent module such that the transverse pivot rod openings align to receive one of the pivot rods;
    a plurality of spheres disposed in the belt modules, the spheres extending through the top and bottom surfaces of the modules, the spheres aligned in a plurality of rows, wherein a sphere from each module aligns with corresponding spheres of the preceding and succeeding modules to form a row extending along the belt in a direction of belt travel;
    a plurality of cylindrical rollers having longitudinal axes disposed substantially parallel to the direction of belt travel, at least one cylindrical roller disposed adjacent the bottom surface of the belt module such that the roller is capable of simultaneously engaging at least two rows of spheres.

2. The diverter conveyor system of claim 1, wherein each belt module has a pair of spheres.

3. The diverter conveyor system of claim 1, wherein the cylindrical rollers are driven simultaneously.

4. The diverter conveyor system of claim 1, wherein the cylindrical rollers are synchronously driven.

5. The diverter conveyor system of claim 1, further comprising a drive sprocket and a driven sprocket.

6. The diverter conveyor system of claim 1, wherein each cylindrical roller engages two rows of spheres.

7. The diverter conveyor system of claim 1, wherein the belt modules are disposed in rows constructed in bricklayed fashion.

8. A diverter conveyor system, comprising:
    a modular belt comprising a plurality of belt modules disposed in rows and a plurality of pivot rods, each pivot rod connecting adjacent modules, the modules, the modules having a top surface and a bottom surface;
    a plurality of spheres disposed in the belt modules, the spheres extending through the top and bottom surfaces of the modules, the spheres aligned in a plurality of rows, wherein a sphere from each module aligns with corresponding spheres of the preceding and succeeding modules to form a row extending along the belt in a direction of belt travel;
    a plurality of cylindrical rollers having longitudinal axes disposed substantially parallel to the direction of belt travel, at least one cylindrical roller disposed adjacent the bottom surface of the belt module such that one roller makes contact with at least two rows of spheres.

9. The diverter conveyor system of claim 8, wherein each belt module has a pair of spheres.

10. The diverter conveyor system of claim 8, wherein the cylindrical rollers are driven simultaneously.

11. The diverter conveyor system of claim 8, wherein the cylindrical rollers are synchronously driven.

12. The diverter conveyor system of claim 8, further comprising a drive sprocket and a driven sprocket.

13. The diverter conveyor system of claim 8, wherein each cylindrical roller engages two rows of spheres.

14. The diverter conveyor system of claim 8, wherein the belt modules are disposed in rows constructed in bricklayed fashion.

15. The diverter conveyor system of claim 8, wherein the belt modules have an intermediate section, a first plurality of link ends extending from the intermediate section, and a second plurality of link ends extending from the intermediate section in a direction opposite to the first plurality of link ends.

16. The diverter conveyor system of claim 15, wherein the first and second link ends have transverse pivot rod openings.

17. The diverter conveyor system of claim 16, wherein the first and second link ends are offset such that the first link ends of a first module are capable of intercalating with the second link ends of an adjacent module such that the transverse pivot rod openings of the adjacent modules align.

* * * * *